United States Patent [19]

Stafford

[11] 4,148,594
[45] Apr. 10, 1979

[54] FAN BLADE FOR WIND MACHINES

[75] Inventor: Thomas P. Stafford, Glendale, Calif.

[73] Assignee: SSP Agricultural Equipment, Inc., Visalia, Calif.

[21] Appl. No.: 805,242

[22] Filed: Jun. 10, 1977

[51] Int. Cl.$^2$ .................... F03D 1/06; F04D 29/34
[52] U.S. Cl. ........................ 416/214 R; 416/102; 416/210 R; 416/248
[58] Field of Search ............... 416/214, 226, 229, 248, 416/100, 102, 210, 148

[56] References Cited

U.S. PATENT DOCUMENTS

| | | | |
|---|---|---|---|
| 1,786,057 | 12/1930 | Fales | 416/41 X |
| 2,071,513 | 2/1937 | Everts | 416/139 X |
| 2,124,369 | 7/1938 | Everts | 416/139 X |
| 2,861,641 | 11/1958 | Bensen | 416/148 |
| 2,863,513 | 12/1958 | Metzger | 416/226 X |
| 2,985,245 | 5/1961 | Maloof | 416/214 X |
| 3,434,546 | 3/1969 | Rodriguez et al. | 416/100 |
| 3,552,881 | 1/1971 | Rodgers et al. | 416/226 X |

Primary Examiner—Everette A. Powell, Jr.
Attorney, Agent, or Firm—Huebner & Worrel

[57] ABSTRACT

A two-bladed propeller fan for wind machines, having a teetering hub for mounting in spaced relationship on a driving shaft, a pair of tangs 180° apart extending outwardly of the hub, each tang having opposed parallel flat surfaces at an acute angle normal to the axis about which the fan revolves, a fan blade extending diametrically outwardly from each respective tang, laminated splice plates securing each blade to a respective tang, said splice plates extending adjacent both sides of said tang parallel surfaces and adjacent both sides of said blades, the outer ends of the tangs and the inner ends of the respective blades being in abutment, said splice plates being in layers of different lengths, the longest of the splice plates on each side being adjacent said tangs and blades, and each plate layered outwardly of the longest plate being successivey shorter so as to form a series of descending steps at their ends diametrically outwardly from the tangs and on the blades; the splice plates being arranged to distribute the stress load on the blades over an extended area, to avoid stress concentrations, to apply gradual bending and loading of the blades adjacent the plates, and to permit flexing of the plates and blades over a substantial portion of said area.

12 Claims, 9 Drawing Figures

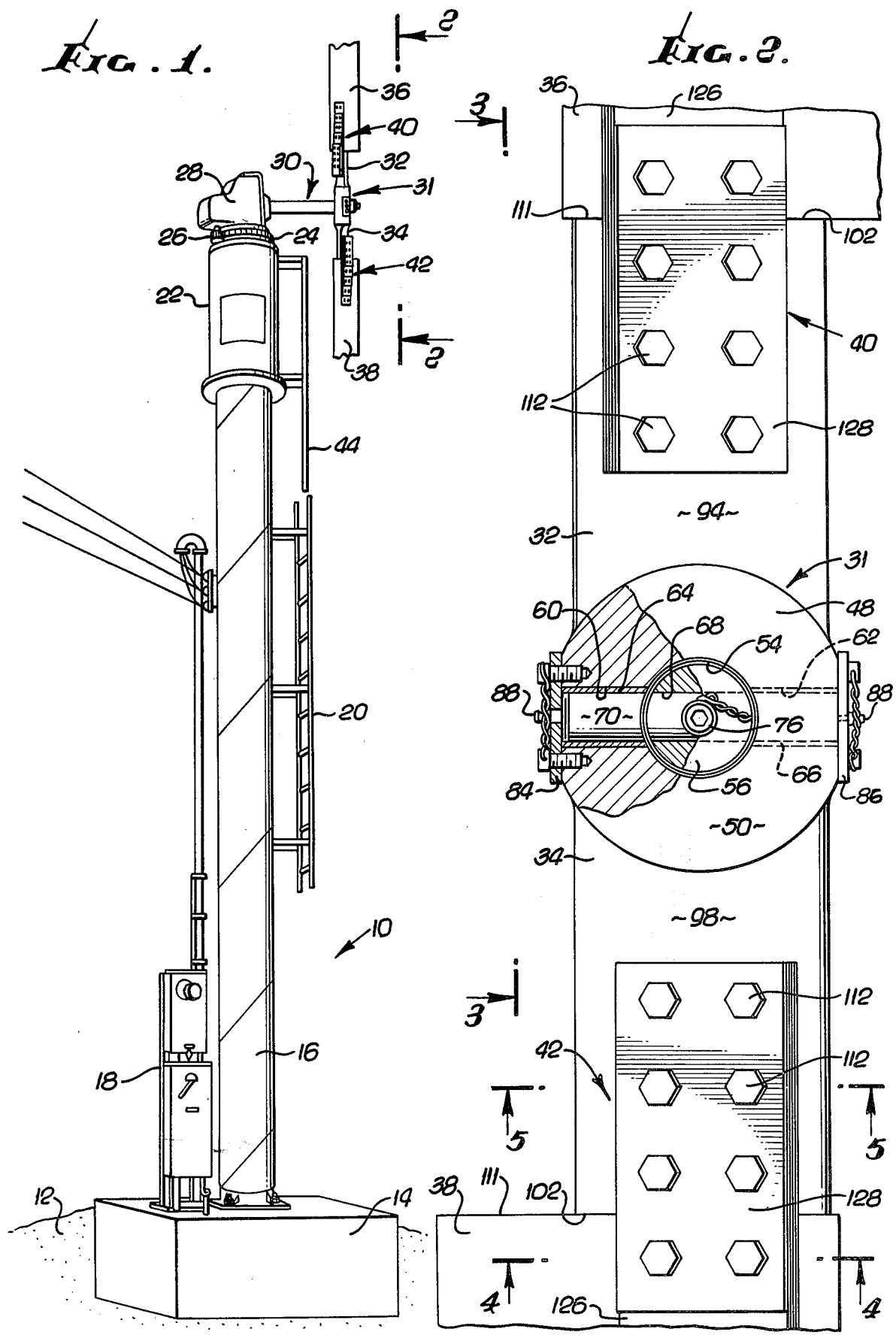

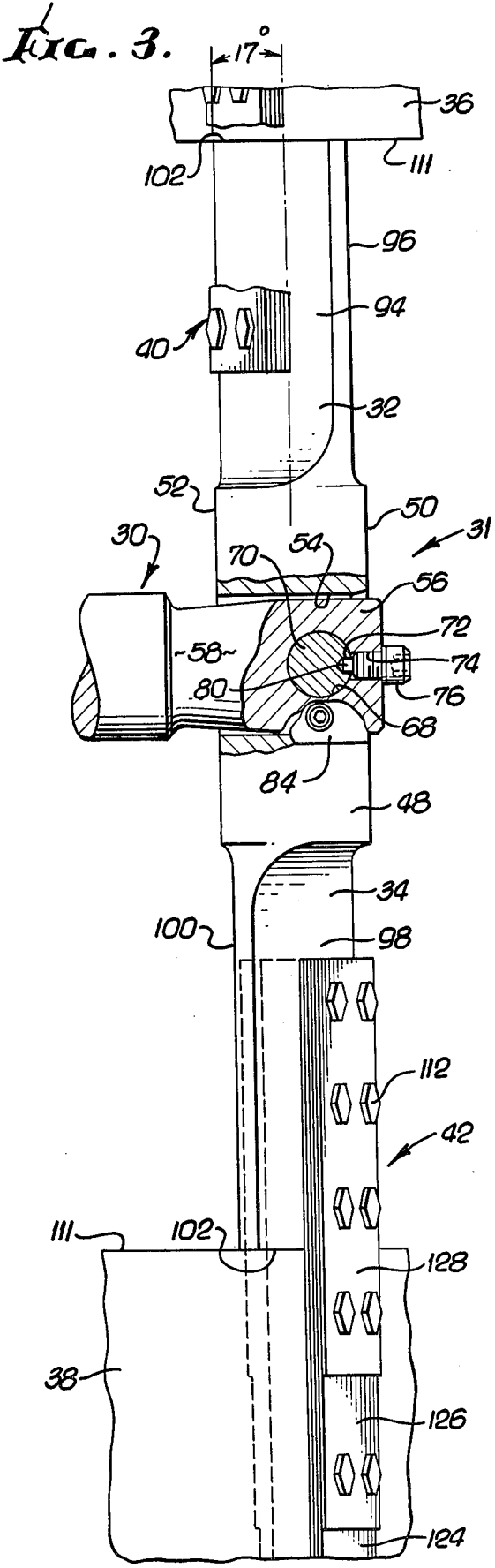
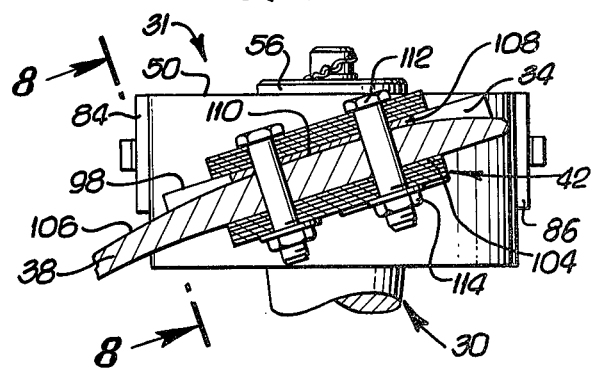
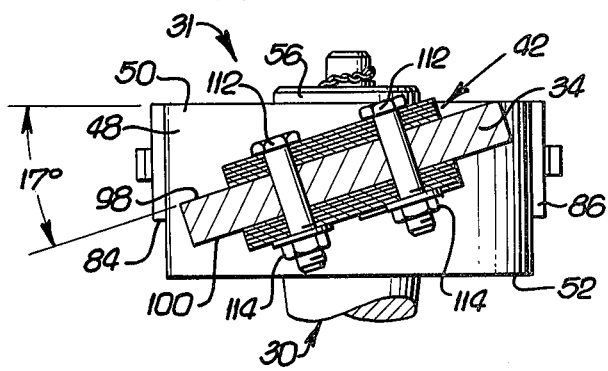
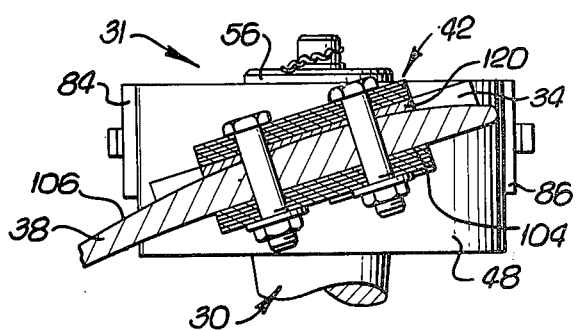

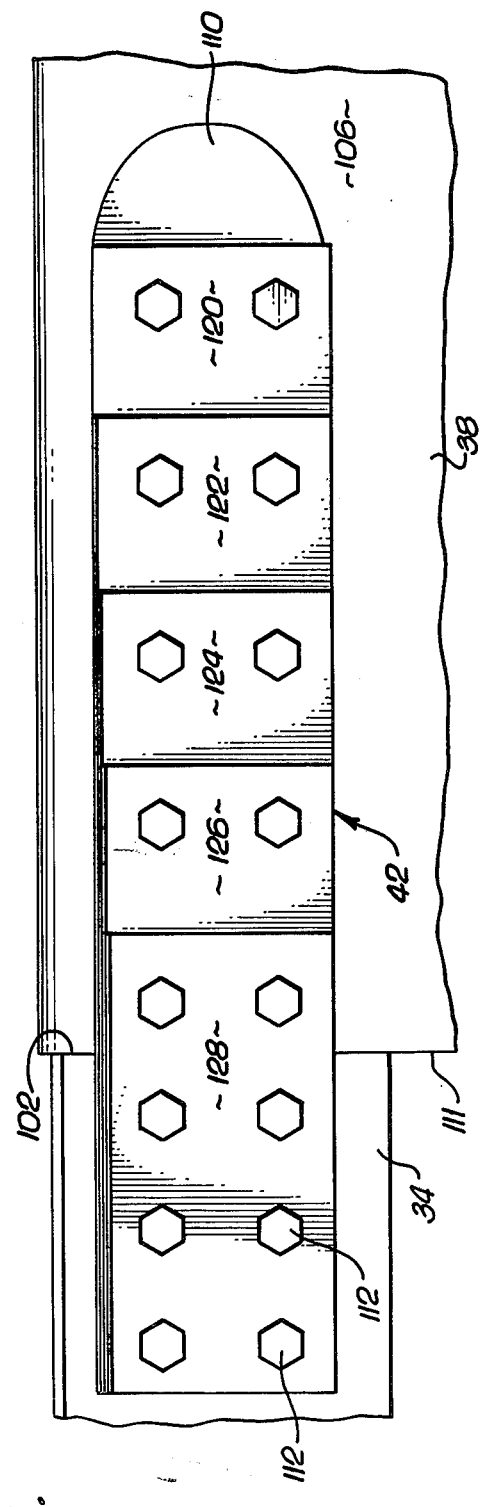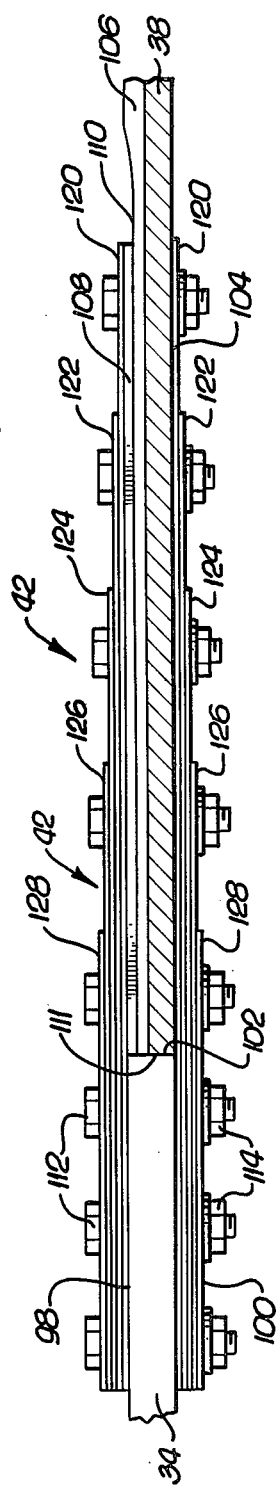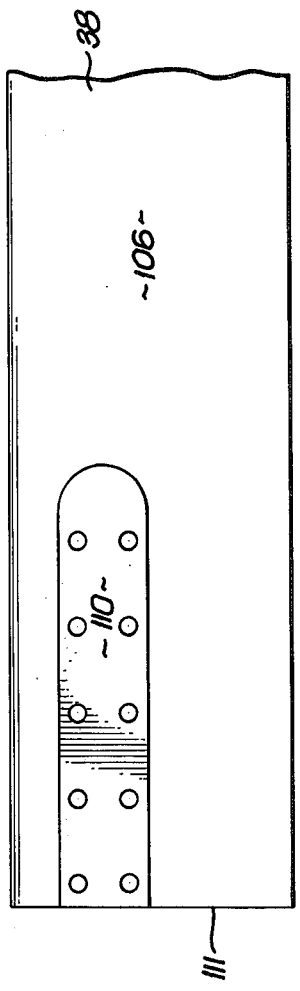

FAN BLADE FOR WIND MACHINES

BACKGROUND OF THE INVENTION

This invention is an improvement of the propeller fan disclosed in U.S. Pat. No. 2,985,245.

Fans according to the invention are used on wind machines for protection of citrus and avocado trees and other growth and crops against damage from cold or other climatic conditions. In some situations a disturbance of the ambient air by forced air flow from the wind machine will suffice to dissipate the harmful effect of quiescent pockets or blankets of cold air which settle over, around and under trees and plants. Under extreme conditions, heating of the circulated air is required.

The fans are rotated about 590 r.p.m. on the top of columns varying in height from about 10 ft. to 40 ft. The fans are driven either by electric motors or by internal combustion engines which may either be at the foot of the column or on the top or adjacent the top of the column. The fan drive assemblies at the top of the column are typically rotated horizontally through 360° at the rate of about 4½ minutes per complete rotation. The fan diameters vary between 11 ft. and 17 ft.

In propeller fans an impulse or thrust is produced by the action of the moving blades on the air impelled. The impulse is directly related to the change in energy travel of the air passing through the plane of the fan. In a fixed fan, the impulse must be restrained completely in order to prevent axial travel of the entire fan mechanism. Therefore, the aerodynamic forces on the blading must be balanced out by reacting forces in the blades and fan structure.

The fan structure providing the best aerodynamic efficiency is in the form of thin extruded aluminum airfoil, except for the structural properties required of the region where the propeller fan joins the hub. At these connections large moments may develop which produce bending stress that actually exceed the tension stresses caused by the centrifugal force. It is thus necessary to provide a mechanism which makes use of the centrifugal force to overcome or remove the bending moment. The connection between the hub and each blade must form a continuous elastic deflectable joint.

In the prior art, solid splice plates were bolted to both sides of the blades and to tangs extending outwardly from the hub to form hub and blade connections of high strength but with a bending stiffness that was relatively high. While this type of connection was substantially successful during the years that they were in use, there have been a number of failures which led to efforts to develop the improvement provided in the present invention. The number of failures was not so great to be an inordinate problem in and of themselves, but the principal problem was in the danger that was produced when a fan broke rotating at about 590 r.p.m. where personnel were working. The fan blades typically broke adjacent the outer end of the splice plates, or at the outer bolts holding the splice plates to the fan.

SUMMARY OF THE INVENTION

The present invention was conceived to distribute stress loads on the blades over longer areas thereof than in the prior art to avoid stress concentrations in the blades. This was accomplished by securing the blades to the hub tangs with a series of laminated splice plates in which the longest of the plates on each side of the blades is adjacent to the respective tangs and each plate layered outwardly of the longest plate being successively shorter so as to form a series of descending steps at the plate ends and to form separate increments of stress transfer to the blades diametrically outwardly from the tangs and on the blades.

Accordingly, it is an object of the invention to provide an improved fan for wind machines, adding significant life expectancy to the fan blades.

It is another object of the invention to provide fans, as described in the preceding paragraphs, in which the splice plate means securing the blades to the hubs distribute stress load over an extended area sufficient to avoid stress concentration in relatively small areas of the blades.

It is still another object of the invention to provide fans, as described in the preceding paragraphs, in which gradual bending loading is applied to the blades adjacent the means securing the blades to the hub.

It is a further object of the invention to provide fans, as described in the preceding paragraphs, in which flexing is permitted in the means securing the blades to the hubs, and in the blades over a substantial portion of the area that the means extend over the blades.

It is a still further object of the invention to apply the aforesaid splice plate securing means over the blades in which flexing occurs in the plates over the blades for the full length of the plates on the blades.

It is another object of the invention in which each of the laminated splice plates provides a separate spaced increment of stress transfer between the plates and the blades.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is an elevational view of a wind machine having a fan according to the invention;

FIG. 2 is a view of the hub and a fragmentary view of the fan, taken along the lines 2—2 of FIG. 1;

FIG. 3 is a view of the hub and a fragmentary view of the fan, taken substantially along the lines 3—3 of FIG. 2;

FIG. 4 is a partially cross-sectional view, taken along the lines 4—4 of FIG. 2;

FIG. 5 is a partially cross-sectional view, taken along the lines 5—5 of FIG. 2;

FIG. 6 is a view, similar to FIG. 4, illustrating another embodiment of the invention;

FIG. 7 is a plan view illustrating the means of connecting the hub and a fan blade, according to the invention;

FIG. 8 is a partially cross-sectional view, taken substantially along the lines 8—8 of FIG. 4; and FIG. 9 is a fragmentary view of a fan blade having a machined flat surface for abutting connection with a splice plate.

DESCRIPTION OF THE PREFERRED EMBODIMENTS

Referring again to the drawings, in FIG. 1 there is shown a wind machine, generally designated as 10, mounted on an earth surface 12 on a concrete block 14.

Secured to the top of the block and extending upwardly therefrom is a lower portion 16 of a column tower.

The wind machine is electrically driven and motor controls 18 are secured to the top of the block alongside the tower. Fitted on the lower part of the tower within reach of the block 14 is a ladder 20.

Secured to the tower portion 16 is a motor housing pod 22, forming the upper portion of the tower and containing the driving motor. Fixed adjacent the top of the pod 22 is a ring gear 24. Mounted for rotation above the pod 22 is fan assembly housing 28 and extending downwardly therefrom on a shaft is a pinion 26 meshed with the fixed ring gear.

Extending horizontally outwardly from the housing 28 is a fan drive shaft 30, having a teetering hub 31 mounted for rotation on its end. Diametrically outwardly on the hub 31 are tangs 32 and 34, 180° apart, to which fan blades 36 and 38 are secured by laminated splice plates, generally designated as 40 and 42. The motor drives reduction gears in the housing 28 which rotates the pinion 26 on the ring gear 24 to rotate the housing 28, the fan shaft and fan blades, forming the fan drive assembly, horizontally 360°, or less, about the axis of the tower. The motor also drives the fan about the axis of the fan shaft.

Secured to the portion 22 of the tower is a ladder 44 adapted to be climbed upon from the ladder 20 for access to the fan assembly and fan.

As shown in FIGS. 1–3, the hub is an iron casting having a central portion 48 integral with the tangs 32 and 34. The central portion is cast generally round having front and back faces 50 and 52 and has a machined axial bore 54 through the center in which outer end 56 of the shaft is fitted. The outer end of the shaft is generally cylindrical, having chamfered edges and has a conical portion 58 which terminates in the elongated portion. The largest diameter part of the shaft 56 is centered in the bore 54 in the hub, the diameter of the bore being about ⅛ of an inch greater than the diameter of the shaft portion so as to provide space for the hub to teeter.

At right angles to the hub axis is a diametrical bore through the hub having two parts 60 and 62 spaced by the bore 54. Outwardly of the bore 54 in the bore parts 60 and 62 are bushings 64 and 66, respectively. In alignment with the bushings 64 and 66 is a bore 68 in the shaft portion 56. A hub teetering and driving pin 70 is fitted in the bushings 64 and 66 and in the bore 68 through the shaft. The pin 70 has a transverse centering bore 72, as shown in FIG. 3, and in alignment therewith is a threaded bore 74 in the shaft end. Threadedly engaged in the threaded bore 74 is a shaft centering bolt 76, having an unthreaded extension 80 fitted into the centering bore 72 in the pin 70 to center it in the hub.

As best seen in FIG. 2, a pair of end plates 84 and 86 are bolted to the hub to secure and seal the pin therein. Centrally fitted within each of the plates are grease fittings 88 so that the pin 70 can be lubricated within the bushings 64 and 66.

The spaced arrangement of the shaft from the hub bore and the arrangement of the pin 70 provides means for the hub to teeter which reduces stresses in the hub caused by strong cross winds. The hub is designed to teeter on the shaft in the space 54 as much as 5°, pivoting on the pin 70. It also is to be noted that the cast hub provides a dampening action against vibration caused by the rotation of the blades.

In FIGS. 2–8 the details of the tangs, splice plates and blading are shown. As best seen in FIGS. 2 and 5, the outer portions of the tangs 32 and 34 are substantially rectangular, having straight edges, flat outer ends 102, and opposite parallel flat sides 94, 96 and 98, 100, respectively, at an acute angle of about 17° to a plane normal to the axis about which the fan revolves.

It should also be noted that the hub is pre-coned in the direction away from that of the air flow caused by the fan. That is, the direction of the tangs is offset from a center line through the hub, perpendicular to the axis of rotation, about 1.5° to 3°. The effect of the pre-coning is to create a bending moment due to centrifugal force which is equal and opposite to the bending moment caused by the thrust force acting on the blade.

As shown in FIGS. 4 and 6, the blades of extruded aluminum have an airfoil configuration in cross section with a curved upper surface 106. Each blade has a flat bottom surface 104 only in the area where the splice plates are fastened to the blades.

The tangs, 34 FIG. 4, are thicker than the blades and a flat shim 108 is positioned between the splice plates and the top of the blade which, FIGS. 7, 8 and 9, has been provided with a flat surface 110 which is parallel to the flat undersurface 104. Depending on the hub design the shim may be on the top or bottom of the blade or on the top or bottom of the hub tang. The importance of the shim is to equalize the thickness of the blade and tang for bolting. For ease of assembly there may be a clearance of between 1/32" to ¼" between the flat outer ends 102 of the tangs and the inner flat ends 111 of the blades.

In the embodiment shown, there are five splice plates 40 and 42, comprised of five layers of 14 gauge hot rolled steel plating, on both sides of the tangs 32 and 34. The splice plates are secured to the tangs by six bolts 112 fitted in bores therethrough and are tightened on the lower side by nuts 114. This construction of the parallel flat surfaces on the tangs and the blades provides for the blades to be joined to the tangs with the bolts in double shear.

For a large fan five or six laminations of splice plates are used on each blade. For a shorter fan, as few as two pairs of splice plates may be used on each blade.

As shown in FIGS. 2, 4 and 7, the fourth row of bolts extending through the five splice plates, the shim, and blade, have the same spacing as the bolts through the tangs. As shown in FIGS. 7 and 8, the longest upper and lower splice plates 120 are in contact with the flat shim 108 on the top of the blade, and the flat surface 104 on the bottom of the blade. An alternate form of shim 120, as shown in FIG. 6, having a flat outer surface and a curved inner surface complementary to the curvature of the blade can be used.

As shown in FIGS. 7 and 8, along with the plates 120, each succeeding pair of splice plates 122, 124, 126 and 128 form series of steps descending outwardly from the plates 128. The bolts through the plates 126, 124, 122 and 120 are spaced apart longitudinally about 3", the longest splice plate 120 being 20" in length.

This arrangement provides means for securing the blades to the tangs to distribute the stress load on the blades over an extended area sufficient to avoid stress concentration on the blades. It further provides means for gradual bending loading on the blades adjacent the splice plates and bolts and permits flexing of the splice plates and blades over a substantial portion of the blade area covered by the splice plates. It has been found that flexing occurs primarily in the outermost plates, as 120, 122 and 124, and around the bolt holes in the blades and splice plates which tend to be slightly enlarged in extended use. It further has been found that after extended use when the splice plates are disengaged from the blade, the plates have a fixed outward bow which indicates the amount of flexing and load distribution over the blades and the plates in operation. This arrangement of extended distribution of loading takes advantage of the fact that the aluminum blading has a modulus of elasticity equal to about one-third of that of the tangs. With five splice plates on each side as shown, there are five specific increments of stress transfer for the splice plates at the various connections to the blading. From long testing operations, this arrangement has been found to add significant longevity to the blades and has eliminated their breaking adjacent the splice plates.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims, wherein various portions have been separated for clarity of reading and not for emphasis.

I claim:

1. In a two-bladed, long propeller fan for wind machines,
  a hub for mounting on a driving shaft,
  a pair of tangs 180° apart extending outwardly of the hub,
  a fan blade extending diametrically outwardly from each respective tang,
  the improvement comprising:
  means securing said blades to said tangs to distribute the stress load on the blades over an extended area to the extent of said means thereon sufficient to avoid stress concentration in a relatively small space, to apply gradual bending loading on the blades adjacent the means, permitting flexing in the means and between the means and blades over a substantial portion of said area, and providing separate spaced increments of stress transfer between said means and blades.

2. The invention according to claim 1, in which:
  said tangs are flat and are in longitudinal alignment with said blades,
  the outer ends of the tangs being adjacent the inner ends of the blades,
  said securing means including a multiple of aligned splice plates on both sides of said tangs and said blades,
  said plates being bolted to said tangs and said blades through holes therein,
  said plates being in layers and of different lengths, one plate of each length being on each side of said tangs and blades,
  the longest of the plates on each side being adjacent said tangs and blades,
  each plate layered outwardly of said longest plate being successively shorter so as to form a series of descending steps at their ends and to form said separate spaced increments of stress transfer diametrically outwardly from said tangs and on said blades.

3. The invention according to claim 2, in which:
  each plate is bolted through its step forming end to said blades.

4. The invention according to claim 3, in which:
  there are two or more plates on said both sides of said blades,
  said area of said permitted flexing on said blades being primarily that of the plates forming the lowest two steps and extending diametrically outwardly to include the locations adjacent the bolts adjacent said lowest two steps,
  said bolt holes being enlarged and said plates being bowed outwardly by said flexing during extended use.

5. The invention according to claim 4, in which:
  said blades have an airfoil cross section provided with flat surfaces for joining with said plates.

6. The invention according to claim 3, in which:
  said bolts are continuous to said both sides, having a head on one side and a tightened nut on the other.

7. The invention according to claim 5, in which:
  the modulus of elasticity of the blades is about one-third that of the tangs.

8. In a two-bladed, long propeller fan for wind machines,
  a teetering hub for mounting in spaced relation on a driving shaft,
  a pair of tangs 180° apart extending outwardly of the hub,
  each tang having opposed parallel flat surfaces at acute angle of about 17° to a plane normal to the axis about which the fan revolves,
  a fan blade extending diametrically outwardly from each respective tang,
  splice plates securing each blade to a respective tang, said splice plates extending adjacent both sides of said tang parallel surfaces and adjacent both sides of said blades,
  the outer ends of the tangs and the inner ends of the respective blades being adjacent,
  the improvement comprising:
  said splice plates being bolted to said blades and tangs and being arranged to distribute the stress load on the blades over the area of said plates on said blades to avoid stress concentration in a relatively small space, to apply gradual bending loading on the blades adjacent the plates, to permit flexing among the plates and between the plates and blades over a substantial portion of said area, and to provide separate spaced increments of stress transfer between said plates and said blades.

9. The invention according to claim 8, in which:
  said splice plates are comprised of a multiple of aligned flat plates on said both sides,
  said bolts being continuous to said both sides, having a head on one side and a tightened nut on the other,
  said plates being in layers and of different lengths,
  the longest of the plates on each side being adjacent said tangs and blades,
  each plate layered outwardly of said longest plate being successively shorter so as to form a series of descending steps at their ends and to form said separate spaced increments of stress transfer diametrically outwardly from said tangs and on said blades, and each plate being bolted through its step forming end to said blades.

10. The invention according to claim 9, in which:
there are two or more plates on said both sides of said blades,
said area of said permitted flexing on said blades being primarily that of the plates forming the lowest two steps and extending diametrically outwardly to include the locations adjacent the bolts adjacent said lowest two steps.

11. The invention according to claim 10, in which:
said blades have an airfoil cross section provided with flat surfaces for joining with said plates.

12. The invention according to claim 11, in which:
the modulus of elasticity of the blades is about one-third that of the tangs.

* * * * *